United States Patent
Reed et al.

(10) Patent No.: US 7,055,888 B2
(45) Date of Patent: Jun. 6, 2006

(54) ARMREST HAVING ARMREST BUN AND METHOD OF MANUFACTURE

(75) Inventors: Randy S. Reed, Fair Haven, MI (US);
Mark Heinze, Clarkston, MI (US);
John D. Youngs, Southgate, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/800,548

(22) Filed: Mar. 15, 2004

(65) Prior Publication Data
US 2005/0200161 A1   Sep. 15, 2005

(51) Int. Cl.
*B60J 9/00* (2006.01)
(52) U.S. Cl. ...................................... 296/153
(58) Field of Classification Search ................ 296/153, 296/1.09, 37.8; 297/411.45, 411.46
See application file for complete search history.

(56) References Cited

U.S. PATENT DOCUMENTS

| | | | |
|---|---|---|---|
| 4,929,017 A * | 5/1990 | Lilienthal et al. | 296/153 |
| 5,893,601 A * | 4/1999 | Carlberg | 296/153 |
| 6,213,538 B1 | 4/2001 | Schiedmantel et al. | |

\* cited by examiner

*Primary Examiner*—Stephen Gordon
(74) *Attorney, Agent, or Firm*—Brooks Kushman P.C.

(57) ABSTRACT

An armrest bun. The armrest bun inserts within an armrest to provide cushioning. The armrest bun includes a support substrate and a poured foam layer. The bun inserting within a cavity of the armrest. The foam layer shaped to match the armrest cavity to limit dead-spots. The bun can be manufactured by position a support substrate in a pouring tool. Foam is poured into a cavity of the pouring tool. The poured foam solidifies to bond to the support substrate. The bun can then be inserted into the armrest.

13 Claims, 2 Drawing Sheets

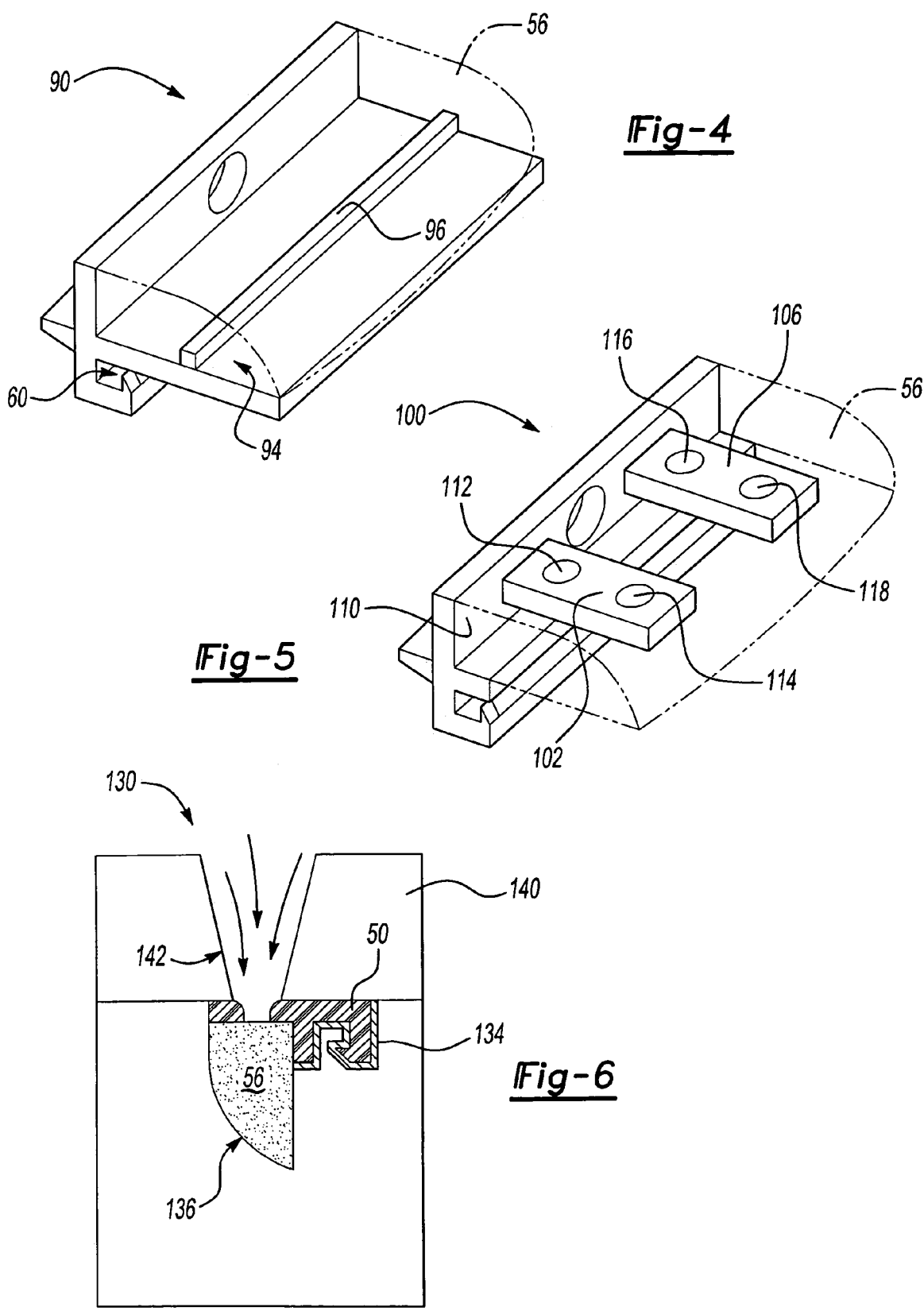

ARMREST HAVING ARMREST BUN AND METHOD OF MANUFACTURE

BACKGROUND OF THE INVENTION

1. Field of the Invention

The present invention relates to armrests of the type having an armrest bun. The armrest bun inserts within the armrest for cushioning.

2. Background Art

U.S. Pat. No. 6,213,538 relates to an armrest and method for manufacturing the same. The '538 patent discloses an armrest bun. The armrest bun includes a die-cut foam pad adhered to a plastic substrate. The substrate and foam are inserted within the armrest to provide cushioning thereto.

Armrests are manufactured in many different sizes and shapes. Past armrests were typically rectangular in shape for ease of manufacturing. Newer armrests may include curvatures and tapers. The new shaping is more aesthetically appealing and can provide better comfort. The foam in the armrest bun must closely match the armrest shaping.

Dead-spots appear on an outer surface of the armrest if the foam fails to closely match the shaping of the armrest. The dead-spots are hollows or gaps at non-cushioned portions in the armrest. The dead-spots appear as indents on the surface of the armrest. The lack of cushioning at the dead-spots interrupts the feel and texture of the armrest.

The dead-spots can be limited by closely shaping the foam to match the shape of the armrest. The matched foam snugly fits into the armrest to provide proper cushioning. The snug fit cushions the outer surface of the armrest to eliminate the dead-spots. The difficulty lies in shaping the foam to match the armrest, and doing so in a cost-efficient manner.

The inventors of the present invention have identified a manufacturing problem with the '538 patent. The problem relates to shaping the die-cut foam disclosed by the '538 patent to properly fit the armrest. Shaping the foam with the desired shaping, which may include curvatures and tapers, requires a number of cutting operations. Multiple workstations may also be constructed to focus on different cuts. One station may be needed to cut a blank, another station may be needed to cut a curve on the blank, and yet another station may be needed to cut a taper on the blank.

It is expensive for a manufacturer to spend time performing multiple cutting steps. It is also expensive for a manufacturer to purchase and maintain the various cutting tools and workstations. Accordingly, it is desirable to provide a more cost-effective method for manufacturing the armrest buns.

SUMMARY OF THE INVENTION

The inventors of the present invention have developed a more cost-effective method for manufacturing an armrest bun that overcomes the above-identified deficiencies of the prior art.

The present invention contemplates a number features, including an armrest bun having a support substrate and a foam layer. The foam layer adheres to the support substrate and inserts within an armrest. The bun is preferably sized and shaped to provide cushioning support to the armrest. The bun preferably supports the armrest such that dead-spots are limited and the armrest has a smooth and uninterrupted texture.

In one aspect of the present invention, the foam layer is a tapered and curved to match a tapered curvature of the armrest. The foam layer preferably comprises a poured foam. The foam can be poured into a mold cavity to adhere to the support substrate. The cavity can be sized and shaped to provide the desired taper and curvature. The poured foam solidifies in the cavity to take the shape of the tapered and curved cavity. The solidified foam matches the taper and curvature of the armrest to provide a snug fit therebetween.

In one aspect of the present invention, the support substrate includes a channel. The channel rides within a shoulder of a support substrate in the armrest cavity to position the support substrate thereto. The support substrate can further include a ridge. The ridge can cooperate with a lip on an outer skin of the armrest to position it thereto. The support substrate can further include a locating face proximate the lip on the outer skin. The locating face corresponds with a bottom-out position of the lip to indicate proper assembly of the outer skin to the support substrate.

In one aspect of the present invention, the support substrate includes an elongated prong. The prong can extend relative to a vertical wall of the support substrate. The foam material can form on a top and/or bottom of the prong. The prong can include apertures through which the poured foam can flow for bonding. The prong can include a prong ridge to limit slippage of the foam layer.

BRIEF DESCRIPTION OF THE DRAWINGS

FIG. 4 illustrates a perspective view of an armrest bun in accordance with a second embodiment of the present invention;

FIG. 5 illustrates a perspective view an armrest bun in accordance with a third embodiment of the present invention; and FIG. 6 illustrates a pouring fixture in accordance with the present invention.

DETAILED DESCRIPTION OF THE PREFERRED EMBODIMENTS

Figure 1:
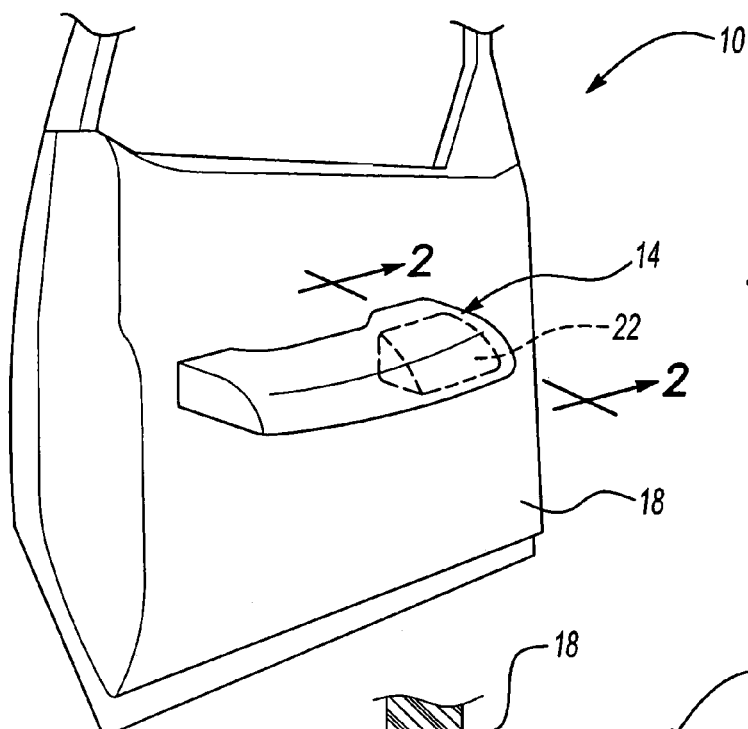
FIG. 1 illustrates a door assembly in accordance with the present invention.

FIG. 1 illustrates a door assembly 10 in accordance with the present invention. The door assembly 10 includes an armrest 14 commonly used in automotive vehicles. The present invention is not limited to the embodiment shown in FIG. 1. The present invention contemplates a number of embodiments, including non-automotive applications, such as boats, trains, planes, and the like.

The armrest secures to a door panel 18 by a fastener or other means to provide a resting location for an occupant in a vehicle. The armrest includes an arcuate or curved-out surface and a tapering edge to provide an aesthetically appealing and comfortable armrest. The curvature and taper generally define an outward appearance shape for the armrest 14. Other shapes and configurations may also be used without deviating from the scope and contemplation of the present invention.

The armrest 14 includes an armrest bun 22. The armrest bun 22 inserts within a cavity of the armrest 14 to provide cushioning thereto. The armrest bun 22 inserts at a lateral rearward end of the door 18. The present invention contemplates alternative designs that may include additional buns 23. The bun 22 and/or additional buns can be inserted at different areas on the armrest 14.

Figure 2:
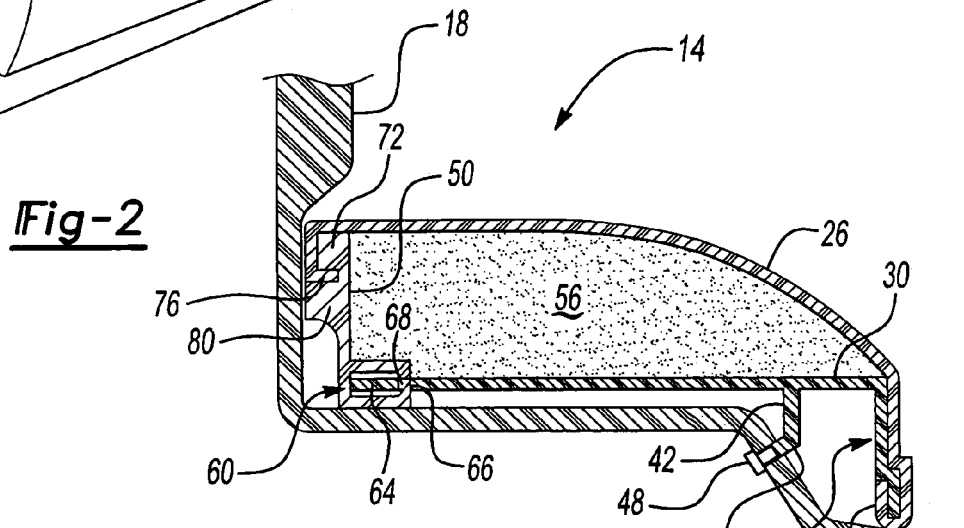
FIG. 2 illustrates a cross-sectional view of an armrest shown in FIG. 1 along the line 2—2.

FIG. 2 illustrates a cross-sectional view of the armrest 14 shown in FIG. 1 taken along line 2—2. The armrest 14 includes an outer skin 26 that wraps around a first substrate 30. The outer skin 26 can be molded to or separately attached to the first substrate 20. The outer skin 26 and first substrate 30 define a first armrest cavity. The outer skin 26 preferably comprises a flexible material to facilitate its comfort. The first substrate 30 is preferably a plastic, metal, or similar rigid material.

The outer skin 26 includes a first lip 34 that wraps around an end 38 of the first substrate 30 to position it thereto. The lip 34 helps secure the outer skin 26 to the first substrate 30 to limit the appearance of a gap between the outer skin 26 and the door 18. The first substrate 30 includes an angle flange 42 to tighten the armrest 14 to the door 18. The angled flange 42 enters through an opening 44 in the door panel during assembly. The angled flange 42 pulls on the first substrate 30 during insertion of the armrest 14 to force the armrest 14 against the door 18, thereby limiting gap formation between the outer skin 26 and the door panel 18. A fastener 48 secures the angled flange 42 to the door panel 18.

The armrest bun 22 includes a second substrate 50 and a foam layer 56. The foam layer 56 adheres to the second substrate 50 for insertion within the armrest cavity defined by the first substrate 30 and the outer skin 26. The foam layer 56 is shaped to match the shaping of the armrest 14 so that it snugly fits within the armrest cavity and provides even support throughout. The close matching of the foam layer 56 to the shaping of the armrest cavity limits dead-spots as most, if not all, of the armrest cavity is supported by the foam layer.

The second substrate 50 includes a channel portion 60. The channel portion 60 cooperates with a shoulder 64 of the first substrate 30 proximate an opening to the armrest cavity. The channel 60 rides within the shoulder 64 to position the second substrate 50 thereto. A detent 66 is located at one end of the channel 60. The detent 66 cooperates with an aperture 68 in the first substrate 30. The detent 66 catches within the aperture 68 to secure the bun 22 therein. The detent 66 also provides a means for determining that the bun 22 has been properly inserted into the armrest cavity, as it limits retraction of the inserted bun 22 when locked.

The second substrate 50 includes a ridge 72 for receiving a lip 76 of the outer skin 26. The lip 76 catches on the ridge 72 to position the outer skin 26 thereto. The ridge 72 limits the outer skin 26 from flexing away from the second substrate 50. Preferably, the outer skin 26 is stretched to fit over the ridge 72 so that force is applied to an underside of the ridge 72 to further secure the outer skin 26 thereto.

The second substrate 50 includes a locating face 80 proximate the lip 76. The locating face 80 is positioned at a bottom-out point of the lip 76. The lip 76 rests on the locating face 80 if the skin 26 is properly assembled. The lip 76 is offset from the locating face 80 if the skin 26 is improperly assembled.

Figure 3:
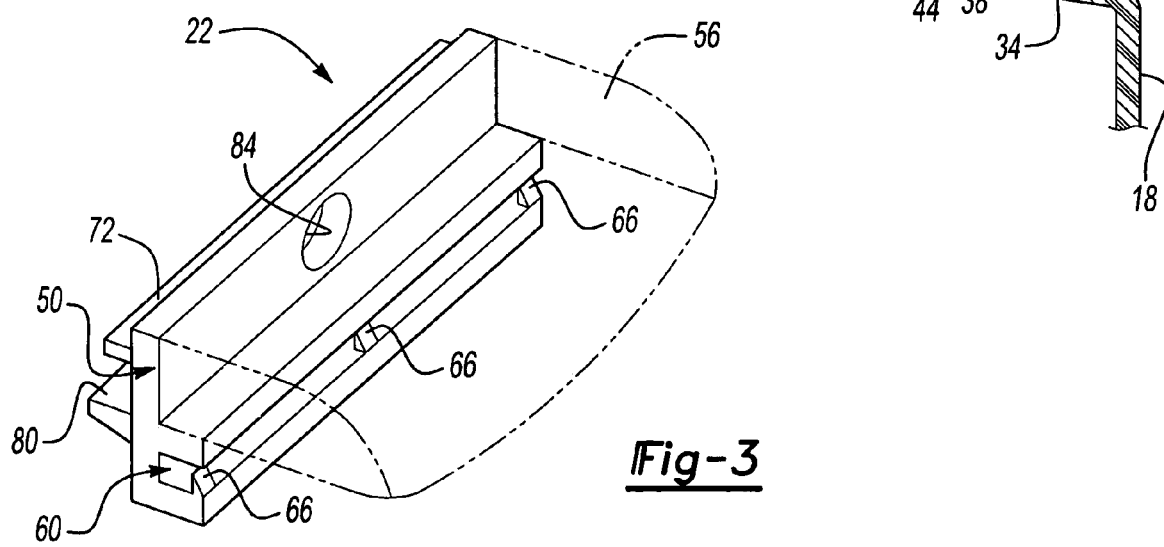
FIG. 3 illustrates a perspective view of an armrest bun in accordance with first embodiment the present invention.

FIG. 3 illustrates a perspective view of the armrest bun 22 in accordance with a first embodiment of the present invention. The perspective view shows the foam layer 56 in phantom to draw out the features of the second substrate 50 in more detail. The locating face 80, the ridge 72, and the channel 60 are shown. A funnel 84 is also shown. The funnel 84 is an aperture in the second substrate 50 through which foam is poured. The pouring of the foam is described below in more detail.

FIG. 4 illustrates a perspective view of an armrest bun 90 in accordance with a second embodiment of the present invention. The bun 90 includes an elongated planar surface or prong 94. The prong 94 projects from a top portion of the channel 60. The prong 94 provides further support for the foam layer 56 shown in phantom. The prong 94 is shown as relatively planar, however, it can be arched to facilitate shaping the foam layer 56. The prong 94 includes a ridge 96. The ridge 96 is an optional feature that the foam layer 56 can bond with to prevent slippage of the foam 56.

FIG. 5 illustrates a perspective view of an armrest bun 100 in accordance with a third embodiment of the present invention. The bun 100 includes two elongated prongs 102 and 106 that project from a vertical wall 110 of the second substrate. Each prong 102 and 106 includes one or more apertures 112, 114, 116 and 118 through which the foam is poured. The foam bonds within the apertures 112, 114, 116 and 118 to prevent slippage of the foam layer 56. Similar prongs could be included within the bun 90 shown in FIG. 4.

FIG. 6 illustrates a pouring fixture 130 in accordance with the present invention. The pouring fixture 130 includes a fixture 134 for receiving the second substrate 50 and a cavity 136. The cavity 136 is shaped according to the desired shaping of the foam layer 56. The cavity 136 can include any shape and configuration, including that which matches the curvature and taper of the armrest cavity.

The second substrate 50 is positioned within the fixture 134 and a lid 140 closes to secure it therein. Foam material is poured through an opening 142 in the lid. The opening 142 aligns with the funnel 84 so that the foam pours through the funnel 84 into the cavity 136. The foam is poured and solidifies. The solidified foam bonds chemically and mechanically to the second substrate 50 to form the buns shown in FIGS. 3–5. The foam could also be injected directly into the cavity through a channel to eliminate the need for a funnel 84 in the second substrate 50.

The foam material preferably comprises any suitable foam material that meets the density and rebound characteristics desired for the armrest 14. The foam material can include polyurethane material. Preferably, the foam material solidifies and bonds to the second substrate in 5–7 seconds.

The time to position the second substrate, to pour the foam, to solidify the foam, and to remove the completed bun 22 is relatively short to facilitate large-scale manufacturing. The foam is preferably poured in a single application to lessen processing time. The pouring fixture 130 can also include multiple cavities 136 to manufacture additional buns in a single foam pour. The bun manufacturing process is cost-effective due to the limited tooling and processing steps.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An armrest, the armrest comprising:
   a first substrate defining a configuration of the armrest and including a first cavity;
   a skin covering the first substrate;
   an armrest bun inserted into the first cavity, the armrest bun including a second substrate and a foam layer, the foam layer comprising a poured foam material directly bonded to the second substrate and not the first substrate; and wherein the first substrate includes a shoulder on an opening side of the first cavity, and wherein the second substrate includes a channel such that the channel of the second substrate mates with the shoulder of the first substrate to position thereto.

2. The armrest of claim 1 wherein a portion of the first cavity has a curvature, and wherein the poured foam material has a corresponding curvature such that the inserted armrest bun snuggly fits to the curvature of the first cavity to limit dead-spots.

3. The armrest of claim 1 wherein a portion of the first cavity has a taper, and wherein the poured foam material has a corresponding taper such that the inserted armrest bun snuggly fits to the taper of the first cavity to limit dead-spots.

4. The armrest of claim 1 wherein the skin is flexible and includes a lip extending over the opening side of the first cavity, and wherein the second substrate includes a ridge such that the lip flexes over the second substrate to catch on the ridge of the inserted armrest bun to position the skin thereto.

5. The armrest of claim 1 wherein the first substrate includes an aperture proximate the opening side of the first cavity, and wherein the second substrate includes a detent, the detent of the inserted armrest bun catching in the aperture of the first substrate to position the second substrate thereto.

6. The armrest of claim 1 wherein the first substrate includes an angled flange, the flange corresponding with an opening in a door panel such that an angle of the flange tightens the first substrate against the door panel when attached thereto to limit separation of the skin from the door panel.

7. The armrest of claim 1 wherein the skin is flexible and includes a lip extending over the opening side of the first cavity, and wherein the second substrate includes a locating face proximate the opening side of the first cavity when the bun is inserted into the first cavity, the lip resting on the locating face of the inserted bun if the skin is properly assembled, the lip separated from the locating face if the skin is improperly assembled.

8. An armrest, the armrest comprising:
a first substrate defining a configuration of the armrest and including a first cavity;
a skin covering the first substrate;
an armrest bun inserted into the first cavity, the armrest bun including a second substrate and a foam layer, the foam layer comprising a poured foam material directly bonded to the second substrate and not the first substrate; and
wherein the first substrate includes an angled flange, the flange corresponding with an opening in a door panel such that an angle of the flange tightens the first substrate against the door panel when attached thereto to limit separation of the skin from the door panel.

9. The armrest of claim 8 wherein a portion of the first cavity has a curvature, and wherein the poured foam material has a corresponding curvature such that the inserted armrest bun snuggly fits to the curvature of the first cavity to limit dead-spots.

10. The armrest of claim 8 wherein a portion of the first cavity has a taper, and wherein the poured foam material has a corresponding taper such that the inserted armrest bun snuggly fits to the taper of the first cavity to limit dead-spots.

11. The armrest of claim 8 wherein the skin is flexible and includes a lip extending over an opening side of the first cavity, and wherein the second substrate includes a ridge such that the lip flexes over the second substrate to catch on the ridge of the inserted armrest bun to position the skin thereto.

12. The armrest of claim 8 wherein the first substrate includes an aperture proximate an opening side of the first cavity, and wherein the second substrate includes a detent, the detent of the inserted armrest bun catching in the aperture of the first substrate to position the second substrate thereto.

13. The armrest of claim 8 wherein the skin is flexible and includes a lip extending over an opening side of the first cavity, and wherein the second substrate includes a locating face proximate the opening side of the first cavity when the bun is inserted into the first cavity, the lip resting on the locating face of the inserted bun if the skin is properly assembled, the lip separated from the locating face if the skin is improperly assembled.

* * * * *